Figure 3:
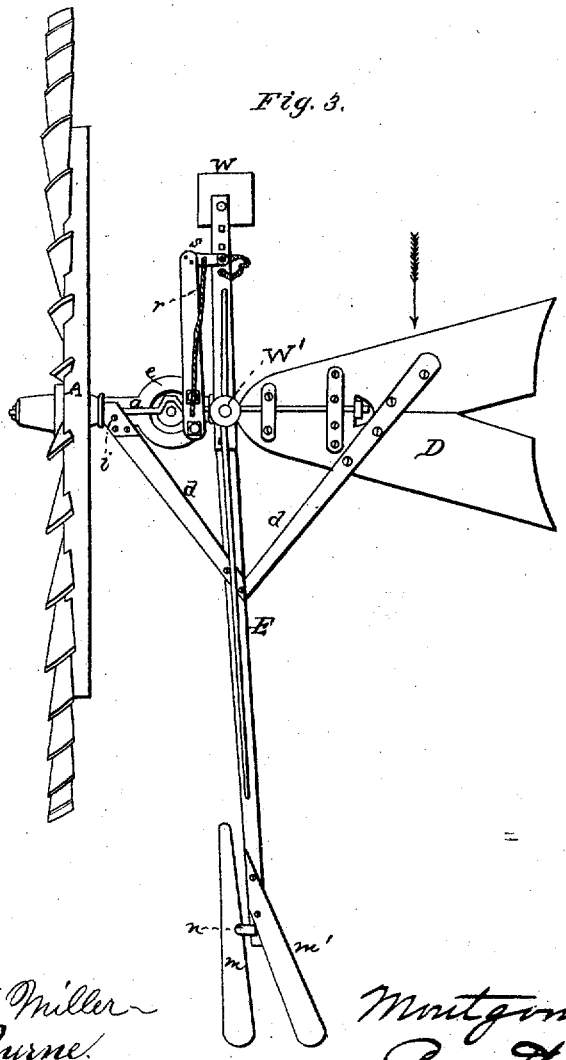

2 Sheets--Sheet 1.
M. CROSSMAN & P. A. SPICER.
Wind-Mills.
No. 5,692. Reissued Dec. 23, 1873.
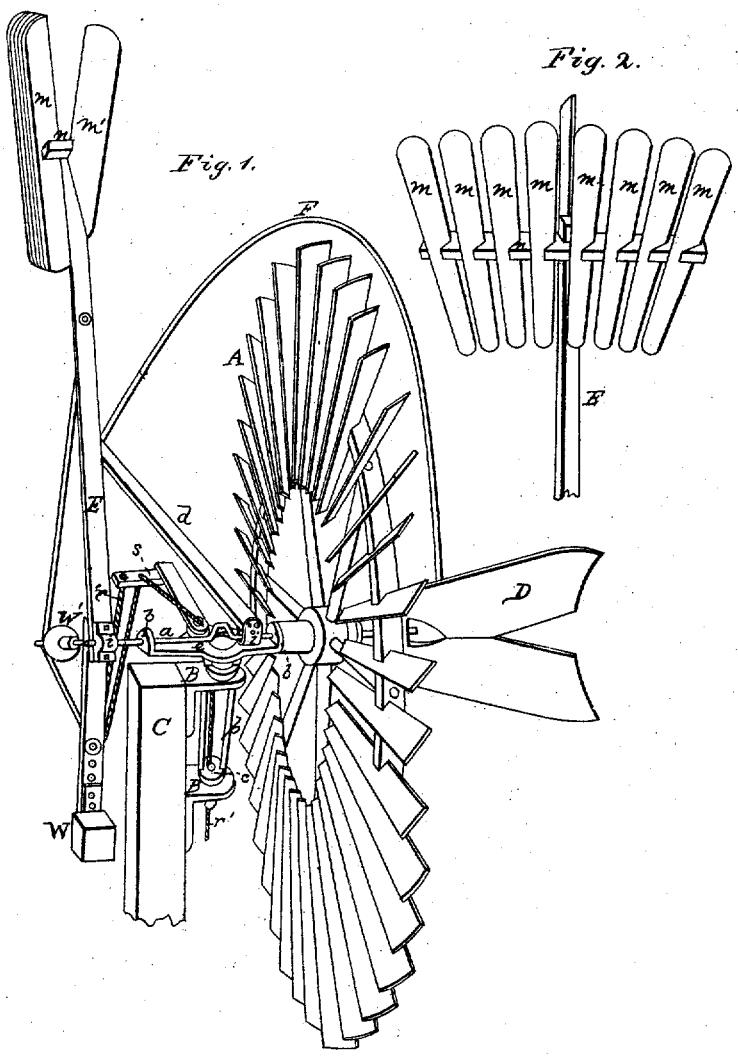
Witnesses.
Henry N. Miller
Thomas. Byrne.
Inventor.
Montgomery. Crossman.
Pratt. A. Spicer.
Per H. S. Abbot.
attorney.
A.M. PHOTO-LITHOGRAPHIC Co. N.Y. (OSBORNE'S PROCESS)

2 Sheets--Sheet 2.

M. CROSSMAN & P. A. SPICER.

Wind-Mills.

No. 5,692. Reissued Dec. 23, 1873.

Witnesses.

Henry N. Miller

Thomas Byrne.

Inventor.

Montgomery, Crossman.

Pratt. A. Spicer.

Per H. S. Abbot.

attorney.

AM. PHOTO-LITHOGRAPHIC CO. N.Y. (OSBORNE'S PROCESS.)

UNITED STATES PATENT OFFICE.

MONTGOMERY CROSSMAN AND PRATT A. SPICER, OF MARSHALL, MICH.

IMPROVEMENT IN WINDMILLS.

Specification forming part of Letters Patent No. 119,971, dated October 17, 1871; reissue No. 5,692, dated December 23, 1873; application filed June 28, 1873.

*To all whom it may concern:*

Be it known that we, MONTGOMERY CROSSMAN and PRATT A. SPICER, of Marshall, in the county of Calhoun and State of Michigan, have invented certain new and useful Improvements in Windmills; and we do hereby declare that the following is a full, clear, and exact description thereof, that will enable others skilled in the art to which it appertains to make and use the same, reference being had to the accompanying drawings, and to the letters of reference marked thereon, which form a part of this specification.

Our invention relates to the employment, in a windmill, of a governor-lever, caused to oscillate back and forth by the combined force of the wind and gravitation, in a plane nearly parallel with the plane in which the wind-wheel revolves, and operating, in connection and combination with a revolving vane, to govern and control the presentation of the wind-wheel to the wind, for the purpose of regulating the velocity of the wheel's motion, and more effectually providing for the safety of the mill in sudden gusts and wind-storms. Our invention further consists in arranging the wind-wheel and vane in such relation to each other on the shaft that the said wheel will be impelled to face the wind in a position behind its vertical axis of rotation around the post, instead of being impelled by the vane to face the wind in front of such axis, as in the usual arrangement; our object being to greatly reduce the size of the vane by calling into action the natural tendency of such a wheel, when unrestrained, to adjust itself in the former-named position, and also to render it more sensitive to the governing devices. It also consists in the arrangement and combination of devices which will be more fully described hereafter.

Figure 1, Sheet 1, is a perspective view of the mill embodying our invention, the governing-lever being hung in front as a counterpoise to the wind-wheel and small vane behind. Fig. 2 is a front elevation of a broken-off section of the wind-wing end of the lever. Fig. 3, Sheet 2, is a plan view, exhibiting the position of the governor-lever when so far oscillated as to hold the vane and wheel feathering to the wind.

A is the wind-wheel, having fixed angularly-set wind wings or sails. *a* is the wheel crank-shaft, hung in raised bearings *b* on a turn-table, *e*, said shaft overhanging at one end to receive the governing-lever, (shown at E,) and also at the other end to receive the wind-wheel, which is keyed fast, and the vane D, which, like the lever, turns freely on the shaft. F is a bent rod, passing over the wheel and connecting the governor-lever with the vane, in coincident lines, so that they will all oscillate simultaneously. The turn-table *e* is provided with a long open pivot, *p*, within and through which the pump-rod works, and which pivot forms the vertical axis on which the wheel turns from or into the wind. But, as this arrangement is already well known and in use, no detailed description is necessary. This pivot is usually hung and stepped in brackets B, bolted to the post C. The long arm of the governor-lever E is furnished at its extremity with one or two cross-bars, *n*, in which several wind-wings, *m m*, are inserted and permanently secured at a proper angle to catch the wind and cause the arm to oscillate; and it is immaterial whether the parts are arranged to have this arm swing to the right or left, and irrespective of the wind-wheel's motion. The lever-stem is hung loosely on the wheel-shaft, at or about the points *i i*, one of the bearings being attached to the end of an angle-brace, *d*, as shown. The short arm of the lever, extending below the points *i*, may be a separate piece, as seen, or form a continuation of the main arm, and it is provided with an adjustable balance-weight, W, and a side counter-balance, W′, to be adjusted usually by screwing it on the projecting stud, over which a straining-brace may pass to stiffen the lever when horizontal.

The gravity and precise positions of the weights W W′ can only be determined by the relation existing between the winged end of the governor and the wind-wheel, as will be more fully explained in describing the mode of operation, as follows: The wind-surface of the wings *m* and the bottom gravity should be so proportioned that the wind will not have the power on said wings to overbalance the weights and oscillate from the vertical until the wind-wheel begins to be driven beyond its maximum velocity, and then the governor-lever, acting through its connection with the shaft *a* on the turn-table *e*, will, if the wind still increases, carry the wheel still farther on its vertical axis, and present a diminished impact surface at an angle more or less obtuse with the wind's path, and thus preserve a proper uniform velocity. This rotation of the wheel is aided by the side wing *m'* being brought round to gradually face the wind at the same time that the resistance of the vane is diminishing, being partially turned on the shaft *a* by the oscillation of the lever. Before the wind can increase so as to endanger the mill, the governor-lever will have been oscillated to a horizontal position and arrested by the arm-stop *s*, attached to the turn-table, the edge of the wheel and vane both feathering the wind, and will be held there as long as the wind blows too strong, because the impact surfaces of the oscillated lever at one end of the shaft, or rather on one side of the vertical axis, presents just as much resistance to the wind as the feathered edges of the wheel and vane present on the opposite side. The wind-wheel will not come into gear with the wind and resume its motion until there is a lull, so that the wind's downward pressure upon the side wing *m'* is so far reduced that the loaded end of the lever will overbalance it, and cause the lever to oscillate back sufficiently into the wind, and, when brought back fully, the lever will hang vertical again, its further motion being arrested by the rope *r*, or other equivalent device. The function of the projecting counter-balance W' is to gradually lessen the gravity as the weight W ascends, and similarly diminish it when descending, in order to steady oscillation. A rope, *r'*, passing from the lever to the arm-stop, thence through the pivot toward the ground, will, on being hauled taut and belayed, maintain the wheel out of gear, by arresting the back oscillation of the lever.

Our governor-lever is equally efficient and applicable in mills having large vanes to impel the wheel to stand in front of its vertical axis, as shown in Fig. 3; but in such case the angle of the hanger-brace *d* would be reversed, and the vane may be connected with the lever by another arm-brace, $d^2$.

Having thus described our invention, we claim—

1. In a windmill, the winged and weighted governor-lever E, attached to the shaft so as to oscillate from nearly an upright to a horizontal or intermediate position, substantially as set forth.

2. In combination with the wind-wheel, the governing devices, substantially as described, arranged upon the shaft in such relation that when acted upon by the wind the governing devices will swing the wheel around from the back to the side of the mast, so as to present its edges to the wind.

3. The rope or stop *r*, attached to the governing-lever E and arm-stop *s*, substantially as described, all arranged and operating to control the action of the lever E in its passage from a horizontal to a vertical position.

4. The arrangement of the arm-stop *s*, attached to the turn-table or pivot, to arrest the further motion of the lever E from a horizontal or inclined position, or throwing the side wing *m'* below a horizontal position with reference to the governing-lever, substantially as shown.

5. The wing *m'* to the back of the wind-wings *m* on the end of the governing-lever E, so that the downward pressure of the wind will act on the lever to prevent it from too suddenly assuming an upright position, substantially as described.

6. The winged and weighted governor-lever E, in combination with the shaft *a*, turn-table *e*, partially-revolving vane D, bent rod F, stop-rope *r*, arm-stop *s*, and wind-wings *m m'*, arranged to operate with the wind-wheel, substantially as set forth.

In testimony that we claim the foregoing, we have hereunto set our hands this 11th day of June, 1873.

MONTGOMERY CROSSMAN.
PRATT A. SPICER.

Witnesses:
A. MORTON,
N. A. BROOKS.